United States Patent
Mikat-Stevens et al.

(10) Patent No.: US 11,969,811 B2
(45) Date of Patent: Apr. 30, 2024

(54) SPINDLE FOR A RECIPROCATING SAW

(71) Applicant: MILWAUKEE ELECTRIC TOOL CORPORATION, Brookfield, WI (US)

(72) Inventors: Leo Mikat-Stevens, Milwaukee, WI (US); Kyle W. Schultz, Grafton, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 442 days.

(21) Appl. No.: 17/346,976

(22) Filed: Jun. 14, 2021

(65) Prior Publication Data

US 2021/0299769 A1    Sep. 30, 2021

Related U.S. Application Data

(63) Continuation of application No. 16/438,089, filed on Jun. 11, 2019, now Pat. No. 11,033,973.

(60) Provisional application No. 62/684,040, filed on Jun. 12, 2018.

(51) Int. Cl.
*B23D 49/16*    (2006.01)
*B23D 51/16*    (2006.01)

(52) U.S. Cl.
CPC ........... *B23D 49/162* (2013.01); *B23D 51/16* (2013.01)

(58) Field of Classification Search
None
See application file for complete search history.

(56) References Cited

U.S. PATENT DOCUMENTS

| | | |
|---|---|---|
| 1,679,884 A | 8/1928 | Thomas |
| 4,206,657 A | 6/1980 | Palm |
| 5,025,562 A | 6/1991 | Palm |
| 5,050,307 A | 9/1991 | Palm |
| 6,249,979 B1 | 6/2001 | Bednar et al. |
| 6,688,005 B1 | 2/2004 | Tachibana et al. |
| 6,851,193 B2 | 2/2005 | Bednar et al. |
| 7,168,169 B2 | 1/2007 | Moreno |
| 7,188,425 B2 | 3/2007 | Bednar et al. |
| 7,637,018 B2 | 12/2009 | Zhang |
| 7,707,729 B2 | 5/2010 | Moreno |
| 8,230,608 B2 | 7/2012 | Oberheim |

(Continued)

FOREIGN PATENT DOCUMENTS

| | | |
|---|---|---|
| CN | 1701914 A | 11/2005 |
| CN | 101234440 A | 8/2008 |

(Continued)

OTHER PUBLICATIONS

Chinese Patent Office Notice of Making Rectification for Application No. 201920882409.9 dated Jan. 21, 2020 (2 pages including statement of relevance).

*Primary Examiner* — Hwei-Siu C Payer
(74) *Attorney, Agent, or Firm* — Michael Best & Friedrich LLP

(57) ABSTRACT

A method of manufacturing a spindle for a reciprocating saw includes machining a first portion of the spindle and forming a throughbore extending through the first portion via a flow welding process. The flow welding process includes rotating a rod relative to the spindle and inserting the rod into the first portion of the spindle, thereby displacing material from the spindle in a direction away from the rod to form the throughbore and a collar adjacent the throughbore.

20 Claims, 5 Drawing Sheets

(56) References Cited

U.S. PATENT DOCUMENTS

| | | | |
|---|---|---|---|
| 8,407,901 | B2 | 4/2013 | Oberheim |
| 8,789,283 | B2 | 7/2014 | Sinur |
| 8,826,547 | B2 | 9/2014 | Oberheim |
| 9,844,829 | B2 | 12/2017 | Yamaji |
| 11,033,973 | B2 * | 6/2021 | Mikat-Stevens ....... B23D 51/16 |
| 2001/0034941 | A1 | 11/2001 | Bednar et al. |
| 2005/0132583 | A1 | 6/2005 | Bednar et al. |
| 2005/0262710 | A1 | 12/2005 | Moreno |
| 2007/0074408 | A1 | 4/2007 | Zhang |
| 2008/0184569 | A1 | 8/2008 | Moreno |
| 2010/0101101 | A1 | 4/2010 | Oberheim |
| 2010/0126027 | A1 | 5/2010 | Oberheim |
| 2010/0126028 | A1 | 5/2010 | Oberheim |
| 2014/0182428 | A1 | 7/2014 | Moreno et al. |
| 2016/0052078 | A1 | 2/2016 | Yamaji |
| 2019/0375032 | A1 | 12/2019 | Mikat-Stevens et al. |
| 2020/0406390 | A1 * | 12/2020 | Weigl ................... B23K 20/123 |
| 2021/0299769 | A1 * | 9/2021 | Mikat-Stevens ....... B23D 51/16 |

FOREIGN PATENT DOCUMENTS

| | | |
|---|---|---|
| CN | 204123370 U | 1/2015 |
| CN | 105121085 A | 12/2015 |
| CN | 106002076 A | 10/2016 |
| DE | 102005024370 A1 | 1/2006 |
| DE | 102007062868 A1 | 8/2008 |
| DE | 202014009958 U1 | 1/2015 |
| WO | 2014182273 A1 | 11/2014 |

* cited by examiner

SPINDLE FOR A RECIPROCATING SAW

CROSS-REFERENCE TO RELATED APPLICATIONS

This application is a continuation of U.S. patent application Ser. No. 16/438,089, filed on Jun. 11, 2019, now U.S. Pat. No. 11,033,973, which claims priority to U.S. Provisional Patent Application No. 62/684,040, filed Jun. 12, 2018, the entire contents of both of which are incorporated herein by reference.

FIELD OF THE INVENTION

The present invention relates to power tools and, more particularly, to reciprocating saws.

BACKGROUND OF THE INVENTION

Reciprocating saws translate rotational motion generated by an electric motor into a reciprocating motion for a drive blade. While various types of mechanisms may be used for translating the rotational motion, one common mechanism is a wobble plate drive. The wobble plate drive includes at least one wobble plate in connection with a drive shaft and a spindle. Typical spindles connect to the wobble plates through a bushing in connection with the spindle. The use of bushings with the spindle is disadvantageous because it requires an expensive and complex welding process, which complicates the manufacturing process.

SUMMARY

In one aspect, the invention provides a reciprocating saw including a housing, a motor positioned within the housing, a drive shaft defining a longitudinal axis, and a spindle positioned substantially within the housing and coupled to a wobble plate, wherein the spindle includes a throughbore formed by a flow welding process, wherein the throughbore extends through the spindle and is configured to receive the wobble plate.

In another aspect, the invention provides a method of manufacturing a spindle for a reciprocating saw. The method includes machining a first portion of the spindle and forming a throughbore extending through the first portion via a flow welding process. The flow welding process includes rotating a rod relative to the spindle and inserting the rod into the first portion of the spindle, thereby displacing material from the spindle in a direction away from the rod to form the throughbore and a collar adjacent the throughbore.

In yet another aspect, the invention provides a method of manufacturing a spindle for a reciprocating saw. The method includes machining a first portion of the spindle, machining a slot on the first portion of the spindle, and forming a throughbore extending through the first portion via a flow welding process. The flow welding process includes rotating a rod relative to the spindle and inserting the rod into the first portion of the spindle, thereby displacing material from the spindle in a direction away from the rod to form the throughbore and a collar.

In a further aspect, the invention provides a method of manufacturing a spindle for a reciprocating saw. The method includes machining a first portion of the spindle, machining a slot on the first portion of the spindle, and forming a throughbore extending through the first portion via a flow welding process. The flow welding process includes rotating a rod relative to the spindle and inserting the rod into the first portion of the spindle, thereby displacing material from the spindle in a direction away from the rod to form the throughbore and a collar adjacent the throughbore. The collar extends from an outer surface of the spindle and surrounds the throughbore.

Other aspects of the invention will become apparent by consideration of the detailed description and accompanying drawings.

Figure 1:
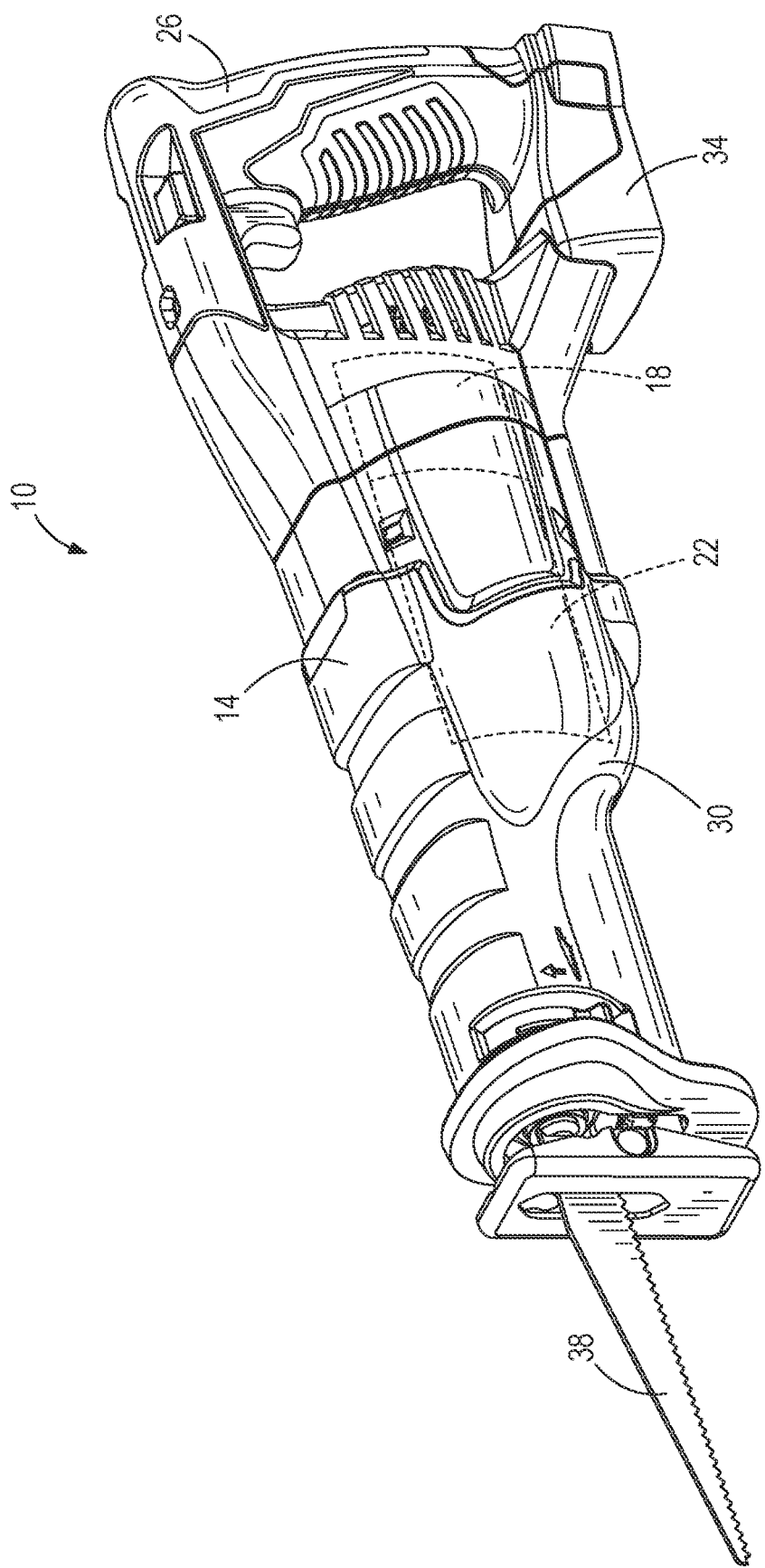
FIG. 1 is perspective view of a reciprocating saw according to an embodiment of the invention.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION

FIGS. 1-5 illustrate a power tool 10 according to one embodiment of the invention. In the illustrated embodiment, the power tool 10 is a reciprocating saw that is operable to drive a tool element (e.g., a saw blade) in a reciprocating motion for cutting a work piece. In other embodiments, the power tool may be a different type of device that is configured to drive a tool element in a reciprocating motion.

The illustrated reciprocating saw 10 includes a housing 14, a motor 18 positioned substantially within the housing 14, and a drive mechanism 22 coupled to the motor 18. The housing 14 includes a grip portion 26 configured to be grasped by a user, a support portion 30 configured to house and support the motor 18 and the drive mechanism 22, and a connection portion 34 configured to support a battery pack.

The motor 18 is coupled to the drive mechanism 22 to drive the drive mechanism 22 and reciprocate a saw blade 38. The motor 18 is connectable to a power source that provides power to the motor 18. The power source may include an interchangeable and rechargeable battery pack that includes one or more battery cells, as shown in FIG. 1. For example, the battery pack may be a 12-volt battery pack and may include three (3) Lithium-ion battery cells. In other constructions, the battery pack may include fewer or more battery cells such that the battery pack us a 14.4-volt battery pack, an 18-volt battery pack, or the like. Additionally or alternatively, the battery cells may have chemistries other than Lithium-ion such as, for example, Nickel Cadmium, Nickel Metal-Hydride, or the like. In other embodiments, the power source may include a power cord providing an alternating current power supply, e.g., from a utility source such as a standard outlet.

Figure 2:
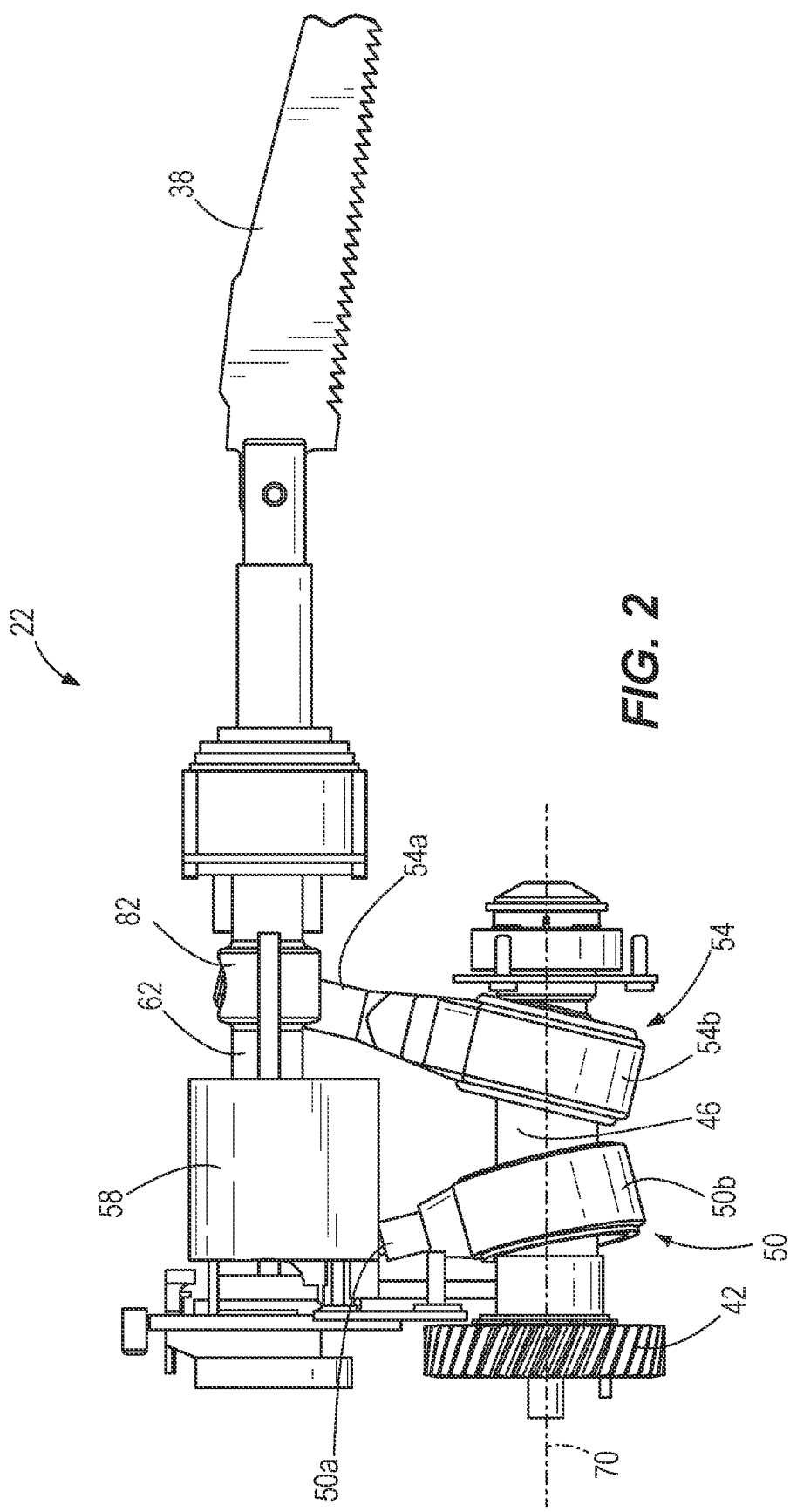
FIG. 2 is a side view of a drive mechanism for use with the reciprocating saw shown in FIG. 1.
Figure 3:
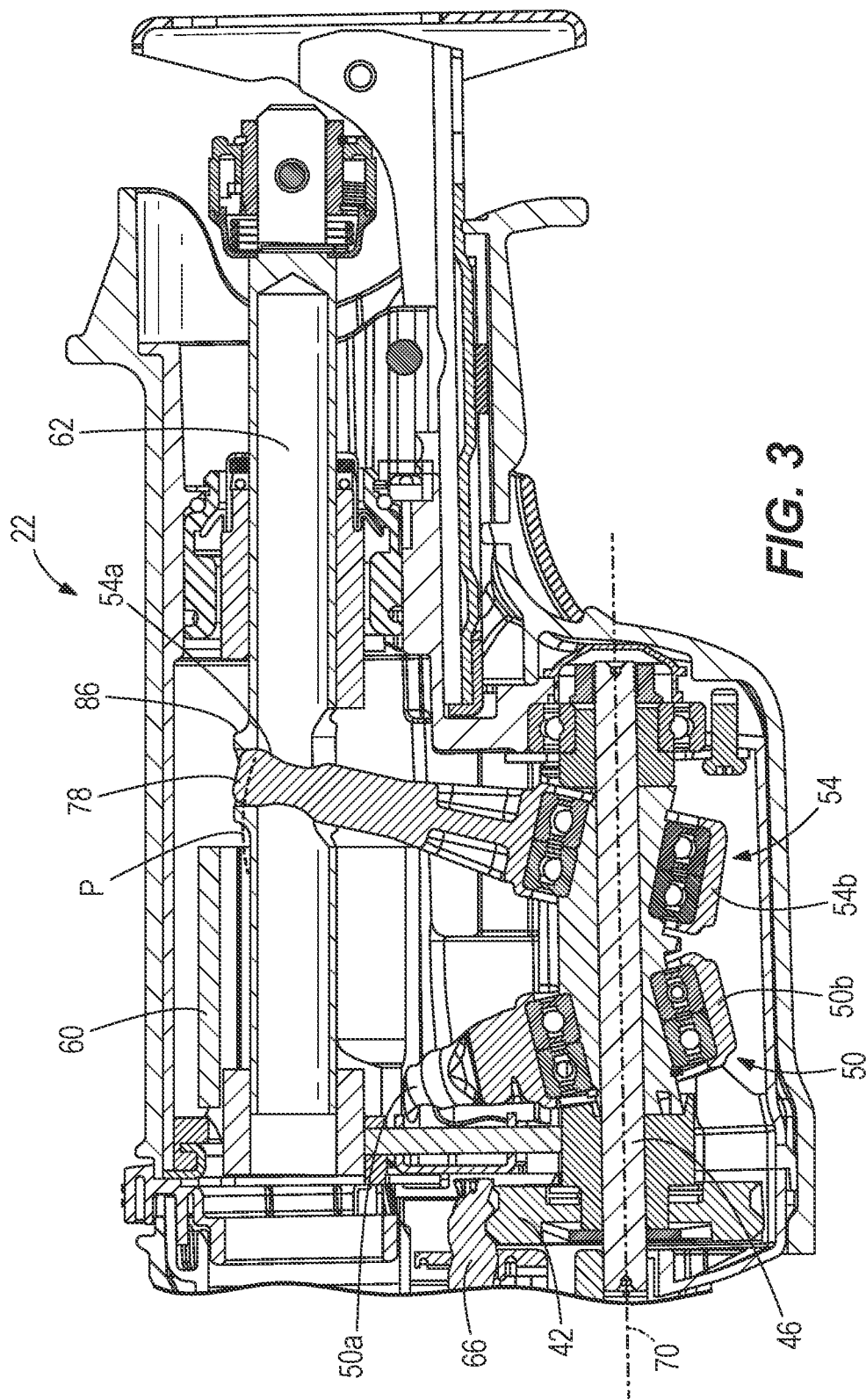
FIG. 3 is an additional side view of the drive mechanism for use with the reciprocating saw shown in FIG. 1.
Figure 4:
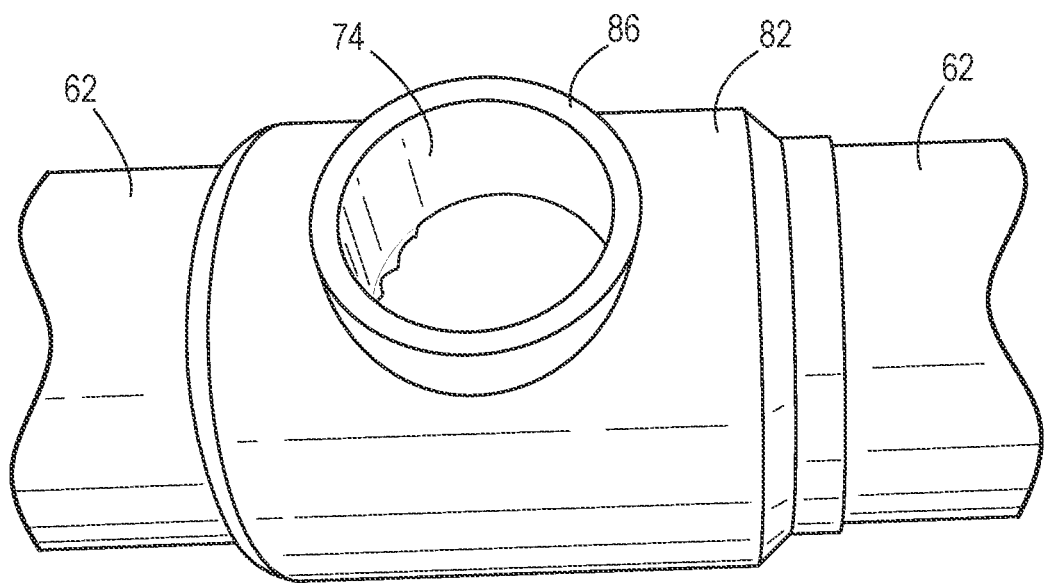
FIG. 4 is top perspective view of a spindle with a throughbore for use with the drive mechanism shown in FIGS. 2-3.

As shown in FIGS. 2-3, the illustrated drive mechanism 22 includes a drive gear 42, a wobble shaft 46, or drive shaft, a first wobble plate 50, a second wobble plate 54, a counterweight assembly 58, and a spindle 62. The drive gear 42 engages a pinion 66 of the motor 18 such that the drive gear 42 is driven (e.g., rotated) by the motor 18. The drive gear 42 is mounted to the wobble shaft 46, or axle, such that the wobble shaft 46 rotates with the drive gear 42. The wobble shaft 46 defines a longitudinal axis 70 about which the wobble shaft 46 and the drive gear 42 rotate.

The first wobble plate 50 is positioned generally normal to the longitudinal axis 70 and includes a shaft 50a and a body 50b. The shaft 50a is coupled to and supported by the counterweight assembly 58 and the body 50b surrounds and is moveable with the wobble shaft 46. The counterweight assembly 58 includes a counterweight 60 supported by the housing 14 for reciprocating and pivoting movement (e.g., orbital movement) relative to the housing 14. The counterweight 60 provides a vibration-reducing force that at least partially counteracts the forces created by movement of the spindle 62 and the saw blade 38.

The second wobble plate 54 is positioned generally normal to the longitudinal axis 70 and includes a shaft 54a and a body 54b. The shaft 54a extends through the spindle 62 via a throughbore 74 (FIG. 3) and the body 54b surrounds and is moveable with the wobble shaft 46. In the position shown in FIG. 2, the second wobble plate 54 extends generally away from the motor 18 and the drive gear 42 to move the saw blade 38 to an extended position. As the wobble shaft 46 rotates, an end portion 78 of the second wobble plate shaft 54a moves through an arcuate path P. After a half rotation of the wobble shaft 46, the second wobble plate 54 extends generally toward the motor 18 and the drive gear 42 to move the saw blade 38 to a retracted position.

The spindle 62 is supported by the housing 14 for reciprocating and pivoting movement (e.g., orbital movement) relative to the housing 14. The spindle 62 is further coupled to the end portion 78 of the second wobble plate shaft 54a. As the second wobble plate 54 moves through the arcuate path P, the end portion 78 of the second wobble plate shaft 54a pushes the spindle 62 to slide the spindle 62 and the counterweight assembly 58 in a generally linear manner relative to the housing 14. Rotation of the wobble shaft 46 is thereby translated into reciprocation of the spindle 62 by the second wobble plate 54. The spindle 62 connects to and supports a saw blade 38 (or other tool element) to reciprocate the saw blade 38 relative to the housing 14.

Figure 5:
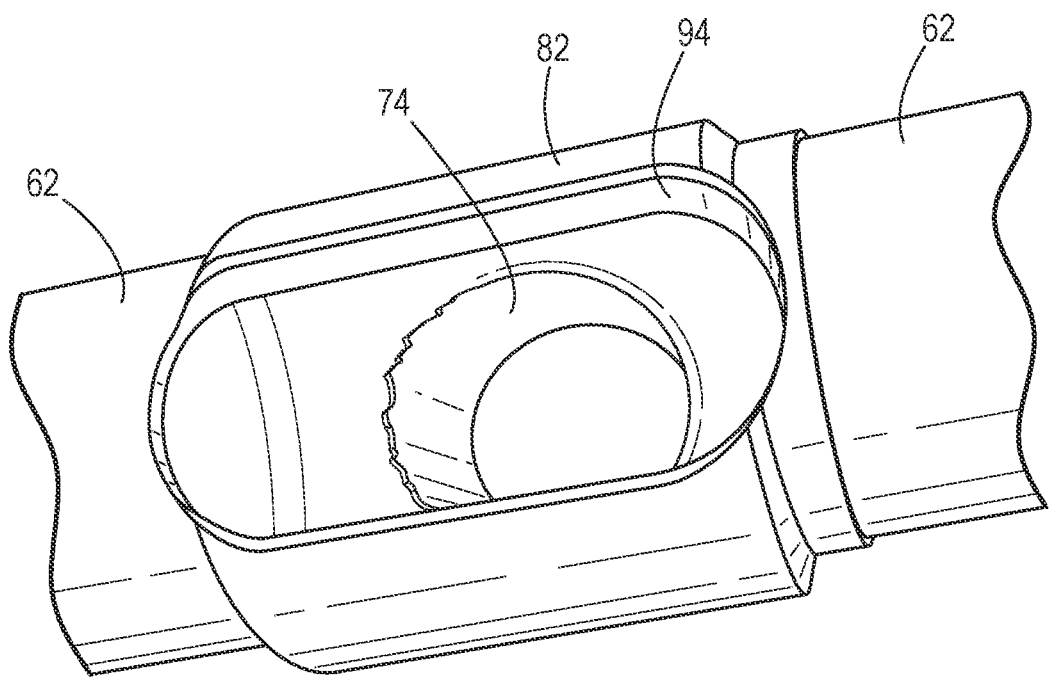
FIG. 5 is a bottom perspective view of the spindle for use with the drive mechanism shown in FIGS. 2-3.

The spindle 62 further includes a machined portion 82 formed integrally with the spindle 62 via a machining process. The spindle 62 includes the throughbore 74 extending through the spindle 62 in order to accept the end portion 78 of the second wobble plate shaft 54a. In order to simplify the manufacturing process of the spindle 62, the spindle 62 is first machined. A collar 86 extending outwards of the spindle 62 is formed using a flow welding process, which also forms the throughbore 74 (FIG. 5). The collar may be sized to meet a drawing specification and extends above or beyond an outer diameter/surface of the spindle 62. The collar 86 further ensures good interaction with the end portion 78 of the wobble plate shaft 54a, even if the wobble plate projects above the outer surface of the spindle.

Providing the spindle 62 with a machined portion 82 and a throughbore 74 is advantageous over previous spindle assemblies that include a separate spindle and a bushing. Previous spindle assemblies machine the spindle with an inner diameter to rest in and then place a bushing within the inner diameter and weld the bushing to the spindle. It is well known in the art that welding can be a challenging process. Specifically, welding increases machine downtime, cost, and time needed to manufacture the spindle. Elimination of the bushing, as shown in the attached embodiments, therefore simplifies the manufacturing process. In other embodiments (not shown), the spindle 62 including the throughbore 74 and collar 86 may be implemented with different arrangements and types of drive mechanisms. In other words, the modified spindle 62 as described above is compatible with other configurations of wobble plate style drive mechanisms or other types of drive mechanisms. Furthermore, the modified spindle 62 as described above is compatible with both AC and DC powered power tools.

Figure 6:
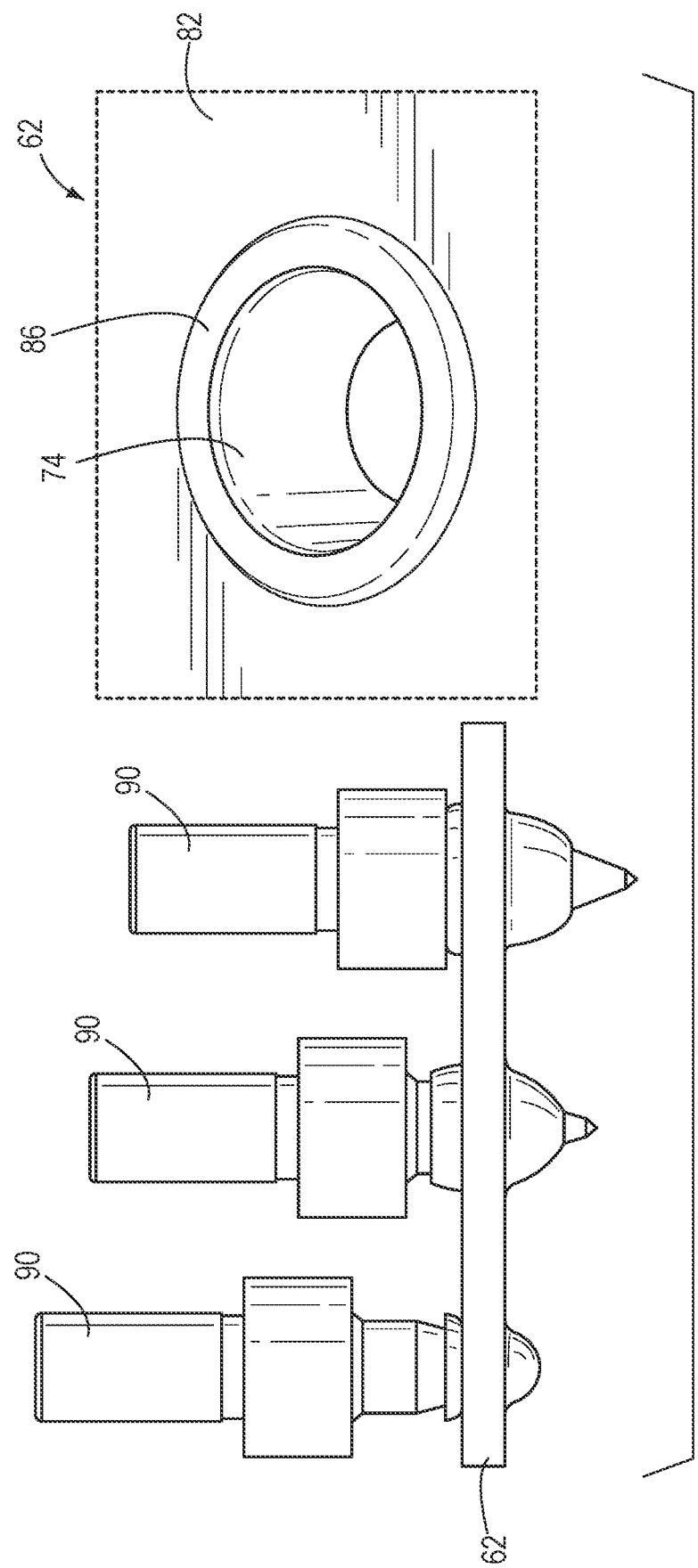
FIG. 6 is a side view of a flow welding process for use with the spindle shown in FIGS. 4-5.

As shown in FIG. 6, during the flow welding process a rod 90 is rotated while inserted through the spindle 62. Rotational friction between the rod 90 and a machined portion 82 of the spindle 62 causes material to displace and form the collar 86. By using the flow welding process, an inner diameter of the collar 86 can be sized in order to meet differing design specifications. The machined portion 82 of the spindle 62 further includes a slot 94 (FIG. 5) machined on a side of the spindle 62 opposite the collar 86 (FIG. 4) for receiving the end portion 78 of the second wobble plate shaft 54a. In other embodiments, the throughbore 74 and collar 86 may be created through alternative processes besides flow welding (e.g., horizontal welding, brazing, etc.).

Various features of the invention are set forth in the following claims.

What is claimed is:

1. A method of manufacturing a spindle for a reciprocating saw, the method comprising:
   machining a first portion of the spindle; and
   forming a throughbore extending through the first portion via a flow welding process, wherein the flow welding process includes
   rotating a rod relative to the spindle; and
   inserting the rod into the first portion of the spindle while rotating the rod, thereby rotational friction between the rod and the first portion causes material to be displaced from the spindle in a direction away from the rod to form the throughbore and a collar adjacent the throughbore.

2. The method of claim 1, further comprising machining a slot on the first portion of the spindle.

3. The method of claim 2, wherein the slot is positioned on a side of the first portion opposite the collar.

4. The method of claim 2, wherein the slot is configured to receive a portion of a wobble plate shaft of the reciprocating saw.

5. The method of claim 1, wherein the collar is configured to receive a portion of a wobble plate shaft of the reciprocating saw.

6. The method of claim 1, wherein the first portion of the spindle is integrally formed with a remainder of the spindle.

7. The method of claim 1, wherein the collar extends above an outer surface of the spindle.

8. The method of claim 1, wherein the collar surrounds the throughbore.

9. A method of manufacturing a spindle for a reciprocating saw, the method comprising:
machining a first portion of the spindle;
machining a slot on the first portion of the spindle; and
forming a throughbore extending through the first portion via a flow welding process, wherein the flow welding process includes
rotating a rod relative to the spindle; and
inserting the rod into the first portion of the spindle while rotating the rod, thereby rotational friction between the rod and the first portion causes material to be displaced from the spindle in a direction away from the rod to form the throughbore and a collar.

10. The method of claim 9, wherein the slot is positioned on a side of the first portion opposite the collar.

11. The method of claim 9, wherein the slot is configured to receive a portion of a wobble plate shaft of the reciprocating saw.

12. The method of claim 9, wherein the collar is configured to receive a portion of a wobble plate shaft of the reciprocating saw.

13. The method of claim 9, wherein the collar extends above an outer surface of the spindle.

14. The method of claim 9, wherein the collar surrounds the throughbore.

15. The method of claim 9, wherein the collar is positioned adjacent the throughbore.

16. A method of manufacturing a spindle for a reciprocating saw, the method comprising:
machining a first portion of the spindle;
machining a slot on the first portion of the spindle; and
forming a throughbore extending through the first portion via a flow welding process, wherein the flow welding process includes
rotating a rod relative to the spindle; and
inserting the rod into the first portion of the spindle while rotating the rod, thereby rotational friction between the rod and the first portion causes material to be displaced from the spindle in a direction away from the rod to form the throughbore and a collar adjacent the throughbore, wherein the collar extends from an outer surface of the spindle and surrounds the throughbore.

17. The method of claim 16, wherein the slot is positioned on a side of the first portion opposite the collar.

18. The method of claim 16, wherein the slot is configured to receive a portion of a wobble plate shaft of the reciprocating saw.

19. The method of claim 16, wherein the collar is configured to receive a portion of a wobble plate shaft of the reciprocating saw.

20. The method of claim 16, wherein the first portion of the spindle is integrally formed with the remainder of the spindle.

* * * * *